May 21, 1963 H. W. MATHERS 3,090,909

SIGNAL TRANSLATING DEVICE

Filed Dec. 22, 1958 2 Sheets-Sheet 1

INVENTOR.
HARRY W. MATHERS

BY Dewey Cunningham
ATTORNEY

United States Patent Office 3,090,909 Patented May 21, 1963

3,090,909
SIGNAL TRANSLATING DEVICE
Harry W. Mathers, Endicott, N.Y., assignor to International Business Machines Corporation, New York, N.Y., a corporation of New York
Filed Dec. 22, 1958, Ser. No. 782,212
3 Claims. (Cl. 323—89)

The present invention relates to magnetic amplifiers and particularly to a new and improved arrangement for controlling said magnetic amplifiers.

Magnetic amplifiers are extensively used in servo systems. Such amplifiers may be of the self-saturating type or of the saturable reactor type. Self-saturating magnetic amplifiers may either be of the half-wave or full-wave type. One form of half-wave self-saturating magnetic amplifiers includes first and second parallel paths having an A.C. voltage connected thereacross. The first path comprises the power winding of a saturable magnetic core, a unidirectional device and a load impedance. The second path comprises a control winding on the aforementioned magnetic core and a means for controlling the current flow through said control winding. The control of the current flow in the second path determines the degree of saturation of the saturable core which determines the impedance which the power winding will offer to the particular half-cycle of the A.C. voltage to which the unidirectional conducting device offers a low impedance.

The full-wave self-saturating magnetic amplifier is comprised of two of the half-wave magnetic amplifiers previously described which are connected to a common load.

In a saturable reactor type of magnetic amplifier there is provided a saturable magnetic core having thereon a power winding, a control winding and an output winding. An A.C. voltage is placed across the power winding, and means are furnished in circuit with the control winding for determining the degree of saturation of the magnetic core. The voltage developed across the output winding is full-wave in nature, the amplitude of the output being determined by the degree of saturation of the core.

A number of various signal translating devices have been used in the past for controlling magnetic amplifiers. These devices generally offer a low impedance to the control power with the result that the control source is loaded excessively.

An object of the present invention is to provide a new and improved control arrangement for magnetic amplifiers which offers a high impedance to the control source.

Another object of the invention is to provide a magnetic amplifier control arrangement having small power requirements and suitable for use with low signal levels.

Still another object of the invention is to furnish a magnetic amplifier in which bias windings are not required to assure that zero output is produced with zero input signal.

A further object of the invention is to provide a full-wave magnetic amplifier of the self-saturating type which utilizes only a single control element.

Still further, it is an object of the invention to provide a new and improved magnetic amplifier control arrangement which has long life and high reliability.

Briefly, the magnetic amplifier control arrangement of the invention comprises a magnetic amplifier having a control winding serially connected in circuit with a ferroelectric element and a D.C. isolation device, there being an A.C. voltage applied across said serial arrangement and a D.C. control voltage connected to a point intermediate said ferroelectric element and D.C. isolation device. The arrangement is such that the A.C. voltage cycles the ferroelectric element through its hysteresis loop, the change in charge across said element during each half cycle being dependent upon the value of the D.C. control voltage applied. The current through the control winding is proportional to the change in charge, said current determining the degree of saturation of the saturable core upon which the control winding is wound. The degree of saturation of the core determines the impedance of the power winding, and thereby the amplitude of the voltage developed across the output device is in circuit therewith.

Other objects of the invention will be pointed out in the following description and claims and illustrated in the accompanying drawings which disclose, by way of examples, the principle of the invention and the best mode, which has been contemplated, of applying that principle.

Figure 6:
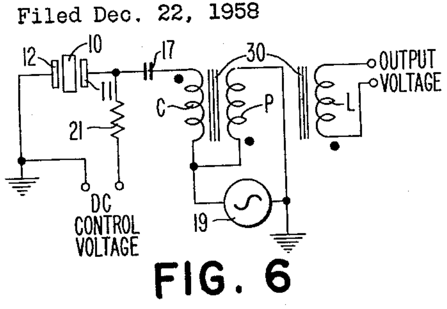
Figure 1:
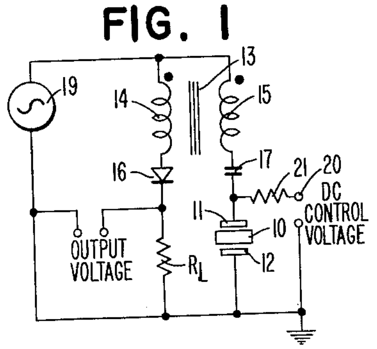
FIG. 1 shows a schematic diagram of a self-saturating magnetic amplifier of the half-wave type utilizing the control arrangement of the present invention.
Figure 5A:
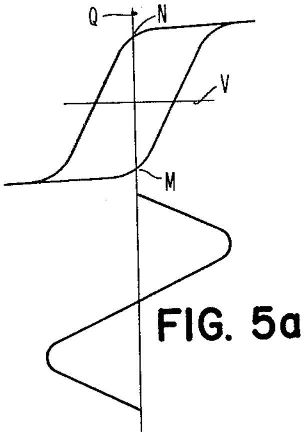
Figure 5B:
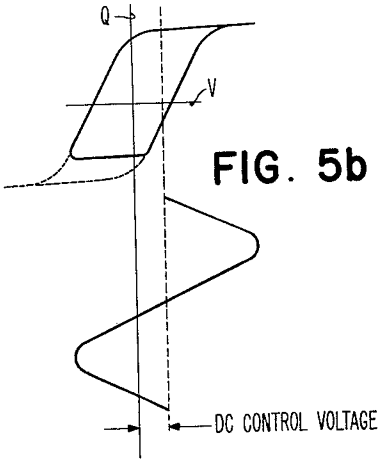
Figure 5C:
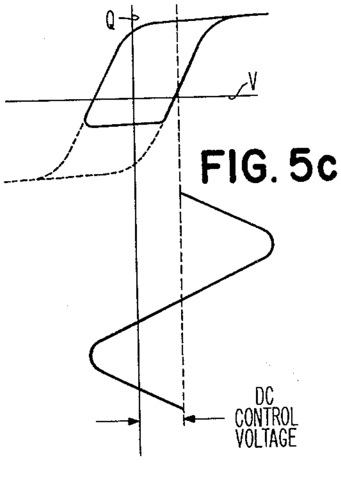
Figure 5D:
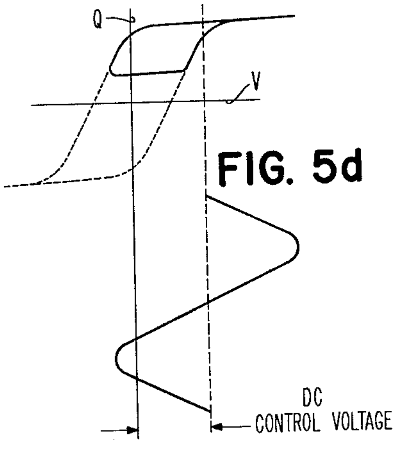
Figure 7:
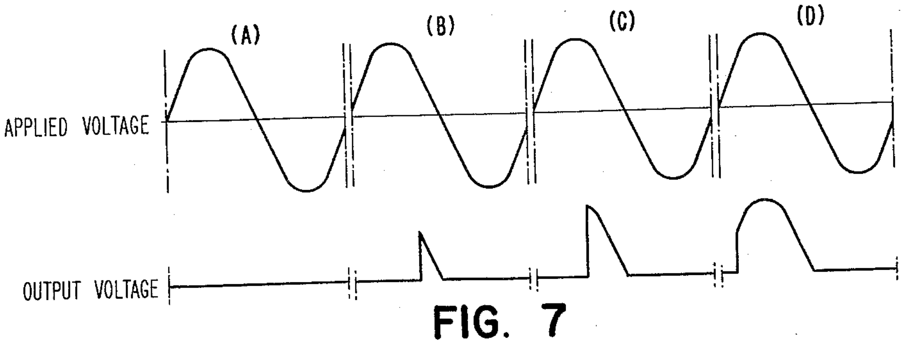

FIG. 5*a* shows a typical hysteresis loop for a ferroelectric element, such as barium titanate, and the A.C. voltage for causing said element to cycle through its hysteresis loop;

FIGS. 5*b*, 5*c* and 5*d* illustrate the cycling of the ferroelectric element through different portions of the hysteresis loop in response to various D.C. control voltages;

FIG. 6 shows a typical saturable reactor type magnetic amplifier utilizing the control arrangement of the present invention; and FIG. 7 shows a plurality of waveforms illustrating various output voltages developed from the FIG. 1 circuit in response to various control voltages.

Ferroelectric elements or crystals are constructed from a material which, when exposed to a voltage, exhibits a relationship between this voltage and the resulting polarization or charge similar to the hysteresis loops exhibited by ferromagnetic materials. Such a hysteresis loop is characteristic of a number of piezoelectric substances such as barium titanate, Rochelle salt, potassium niobate, sodium niobate and potassium dihydrogen phosphate. Crystals of these compounds vary with respect to the temperature range within which they exhibit ferroelectric properties, and in coercivity, dielectric constant and saturation polarization. Barium titanate is perhaps the most commonly used compound for a ferroelectric element. The construction of such ferroelectric elements takes many different forms but generally comprises a ferroelectric crystal having silvered spots on the opposite sides thereof to serve as plates or electrodes.

Referring to FIG. 1, the ferroelectric element utilized in the present invention comprises a ferroelectric crystal 10 having silvered spots on the opposite sides thereto to serve as condenser plates 11 and 12. As previously mentioned, the crystal 10 is preferably of barium titanate, although other suitable crystals possessing the proper characteristics may be used. A typical hysteresis loop for the ferroelectric element is shown in FIG. 5*a*. Voltage V and charge Q are respectively assigned to the abscissa and ordinate. When the A.C. voltage shown below the hysteresis loop is just starting its positive half cycle, the crystal is at point (M) on the loop. The A.C. voltage drives the crystal up into positive saturation during the first 90° of the positive half cycle. At the end of the next 90°, the crystal is at point (N). By the end of the negative half cycle, the crystal is back to point (M).

The self-saturating half-wave magnetic amplifier shown in FIG. 1 comprises a saturable magnetic core 13 having a power winding 14 and a control winding 15 wound thereon. The core 13 may be of the type having a hysteresis loop characteristic similar to that shown in solid lines in FIG. 4, the magnetic field intensity H being represented along the abscissa and the flux $\phi$ being shown along the ordinate. In the drawings, a dot is provided adjacent a particular end of each of the windings to indicate winding orientations.

Power winding 14 and control winding 15 may be considered to be respectively in first and second parallel paths. In the first path, the plate of diode 16 is connected to one end of the power winding 14, the cathode of said diode being connected through a load resistor $R_L$ to ground. The second path comprises a capacitor 17 connected between one end of control winding 15 and condenser plate 11 of the ferroelectric element. Condenser plate 12 of the ferroelectric element is connected to ground. An A.C. voltage source 19 is impressed across said first and second parallel paths. The D.C. control voltage for controlling the magnetic amplifier is connected to terminal 20. Resistor 21 connects terminal 20 to a point intermediate capacitor 17 and the ferroelectric element. The output from the magnetic amplifier is taken from across the load resistor $R_L$.

Operation of the circuit shown in FIG. 1 will first be considered under conditions where there is an absence of D.C. control voltage applied to terminal 20. It will be noted that diode 16 is oriented such that it will offer a low impedance to a voltage applied to the upper end of winding 14 which is positive with respect to ground. Therefore, the first path may be considered to be effective to pass current during the positive half cycle of the A.C. voltage from source 19. It will be apparent that diode 16 could be reversed in polarity so that current would be passed during the negative half cycle; but for the purposes of this explanation, the orientation of a diode as shown will be used.

Figure 4:
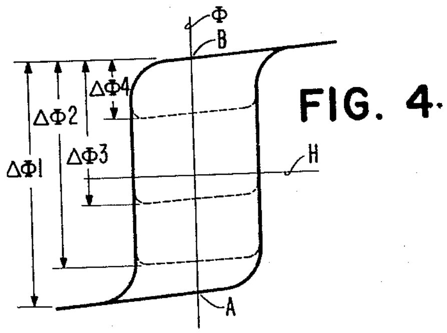
FIG. 4 shows a typical hysteresis loop of a saturable magnetic core which may be used in the magnetic amplifiers shown in FIGS. 1 through 3.

Assume the following initial conditions: zero D.C. control voltage; magnetic core 13 is in negative saturation as indicated at point (A) in FIG. 4; the positive half cycle of A.C. source 19, as seen at the dotted ends of windings 14 and 15, is just beginning; and the ferroelectric crystal 10 is at point (M) in FIG. 5*a*. The waveform of the A.C. source is shown in FIG. 5*a* as varying in voltage along the abscissa V with a zero reference along the ordinate Q.

As the positive half cycle begins, current flows in both the first and second parallel paths. With core 13 in negative saturation, winding 14 offers a high impedance to current flow in the first path and core 13 will be driven into the positive saturation region, there being only a negligible voltage drop across the load resistor $R_L$, as shown at (A) in FIG. 7. The voltage applied across the second path will drive crystal 10 from the negative saturation level at point (M) into the positive saturation region, it being understood that at the end of the positive half cycle the crystal will be at point (N) on its hysteresis loop.

During the negative half cycle of the A.C. source, i.e., during the time that the dotted ends of windings 14 and 15 are negative relative to ground, current flow is blocked in the first path due to diode 16. However, current can flow in the second path. Crystal 10 is cycled down into the negative saturation region of the hysteresis loop shown in FIG. 5*a*. The current flow through winding 15 during the last-mentioned cycling of the ferroelectric crystal causes core 13 to undergo a change in flux $\Delta\phi 1$ so as to be driven from point (B) on the hysteresis loop in FIG. 4 down into the negative saturation region. Thus, the core and crystal are back into their original state as assumed at the beginning of circuit operation. During further cycles of the A.C. source, a similar action as that described would occur with the result that there would be a negligible output voltage developed across the load resistor $R_L$.

Consider now that the D.C. control voltage applied to terminal 20 goes above ground. The resulting changes in the D.C. control voltages in step-wise fashion is shown in FIGS. 5*b*, 5*c* and 5*d*. The D.C. voltage has the effect of displacing the A.C. voltage used to cycle the ferroelectric crystal to one side of the original axis, the degree of displacement being determined by the value of the D.C. control voltage.

For simplicity of explanation, let it be assumed that a small D.C. voltage is applied to terminal 20. The effect of this D.C. voltage on the cycling of the hysteresis loop for the ferroelectric crystal can be seen in FIG. 5*b*. The A.C. voltage is now displaced along the positive voltage axis. Under these circumstances, the lower portion of the hysteresis loop is cut down in size from that shown in FIG. 5*a*. The current $i$ required during the negative half cycle of the A.C. source to cycle the crystal is proportional to the change in charge $\Delta Q$ divided by the change in time $\Delta t$; i.e., $$i \approx \frac{\Delta Q}{\Delta t}$$

It will be seen from FIG. 5*b* that $\Delta Q$ will be less than was the $\Delta Q$ of the ferroelectric crystal in FIG. 5*a*. This means that less current will flow in the second path during the negative half cycle than was the case in FIG. 5*a*. The result of this action is that control winding 15 has less current flowing through it during the negative half cycle so that core 13 will be driven to a different negative level than the previous case. That is, the change in flux $\Delta\phi 2$ through which the core 13 will be driven during the negative half cycle, due to a small D.C. control voltage, will be less than the change in flux $\Delta\phi 1$ which occurred with the zero D.C. control voltage. With the core 13 in the indicated condition at the end of the negative half cycle, the voltage applied to winding 14 will cause the core to reach positive saturation sooner during the positive half cycle than with zero D.C. control voltage. As soon as core 13 is saturated, winding 14 offers a low impedance during the remainder of the positive half cycle, the result being that there now exists an output voltage which is developed across the load resistor $R_L$, as shown at (B) in FIG. 7.

As shown in FIGS. 5*c* and 5*d*, if the D.C. control voltage is respectively increased step-wise in greater amounts, the ferroelectric crystal will be cycled through smaller hysteresis loops. The result is that $\Delta Q$ in FIG. 5*c* will be less than was the case in FIG. 5*b*, and $\Delta Q$ in FIG. 5*d* will be less than was the case in FIG. 5*c*. Since the current flowing through the crystal is proportional to the change in charge $\Delta Q$, there will be less current allowed to flow through the control winding during each negative half cycle. This means that core 13 will not be driven as far negatively on the hysteresis loop as in the previous cases. For example, the changes in flux $\Delta\phi 3$ and $\Delta\phi 4$, as seen in FIG. 4, would respectively occur during the negative half cycle of the A.C. source for the change in charge during said negative half cycle shown in FIGS. 5*c* and 5*d*. The waveforms at (C) and (D) in FIG. 7 will respectively result from the conditions shown in FIGS. 5*c* and 5*d*.

It will be apparent from the above detailed description that as the D.C. control voltage is increased from zero to a maximum, the change in charge $\Delta Q$ across the ferroelectric crystal will decrease from a maximum with zero control voltage to substantially zero with a maximum control voltage. The gradations in between will vary according to the particular characteristic of the ferroelectric element. As the change in charge $\Delta Q$ of the negative half cycle varies, the current flow $i$ through the control winding will change proportionately therewith and thereby vary the change in flux $\Delta\phi$ of the magnetic core 13 during the negative half cycle. The specific relationship between current $i$ through the control winding and the change in flux $\Delta\phi$ of the core during said negative half cycle will depend upon the particular characteristics of the core and the number of turns of control winding 15. The output voltage developed across load resistor $R_L$ will vary according to the change in flux $\Delta\phi$ which the positive half cycle must produce in the core to return it to positive saturation. That is, the sooner during the positive half cycle that the core is returned to positive saturation, the more there will be remaining of the positive half cycle during which a voltage can be developed across the load resistor $R_L$.

Figure 2:
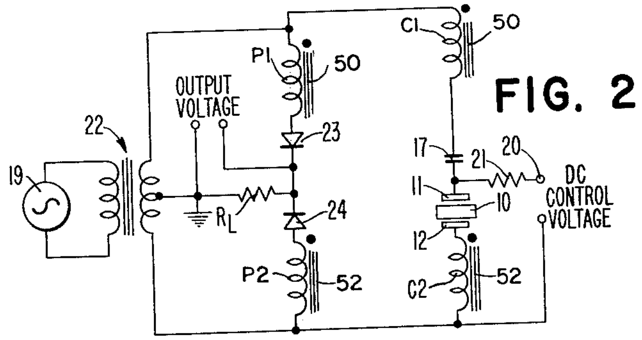
FIG. 2 shows a schematic diagram of a first form of a self-saturating magnetic amplifier of the full-wave type utilizing the control arrangement of the present invention.

Referring now to FIG. 2, there is illustrated a first embodiment of a full-wave magnetic amplifier utilizing the particular control arrangement previously described. As seen in FIG. 2, the A.C. source 19 is connected to the primary of a transformer 22, the secondary of said transformer being center-tapped and connected to ground. One end of the secondary is connected to one end of a power winding P1, and the other end of the secondary is connected to one end of a power winding P2. The other end of power winding P1 is connected to the plate of a diode 23, the cathode of said diode being connected to one end of a load resistor $R_L$. The other end of the load resistor is connected to ground. The end of power winding P2 opposite to the end connected to the secondary of transformer 22 is connected to the plate of a diode 24 having its cathode connected to the ungrounded end of resistor $R_L$.

A control winding C1 has one end connected to one end of the secondary of transformer 22 and the other end connected through a capacitor 17 to the condenser plate 11 associated with the ferroelectric crystal 10. The condenser plate 12 is connected to one end of a control C2 having its other end connected to the other end of the secondary of transformer 22. The D.C. control voltage is connected to terminal 20, as in FIG. 1, and is applied through resistor 21 to a point intermediate capacitor 17 and the ferroelectric element. The output voltage is developed across load resistor $R_L$.

It should be understood that the power winding P1 and the control winding C1 are wound on the same saturable magnetic core 50, and that the power winding P2 and the control winding C2 are wound on a different saturable magnetic core 52.

The operation of the circuit shown in FIG. 2 can best be understood by considering a particular A.C. input condition at the opposite ends of the secondary of transformer 22. It will be seen that the orientation of diodes 23 and 24 is such that one of the diodes will be conductive during one half cycle of the A.C. voltage from source 19, and the other diode will be conductive during the other half cycle. Considering a time when the upper end of the secondary of transformer 22, as shown in the drawings, is positive with respect to ground and the lower end of said secondary is negative with respect to ground, it will be seen that diode 24 will block current flow through the power winding P2. However, current can flow during this half cycle through the power winding P1, diode 23 and the load resistor $R_L$. This current through the core associated with power winding P1 will drive the core into the positive saturation region. Assuming that the core was originally in the negative saturation region, a negligible output voltage is developed across load resistor $R_L$, since a major portion of the A.C. voltage is required to drive the core associated with winding P1 from negative saturation to positive saturation. During this same interval, current will also flow through the control winding C1, resistor 18, capacitor 17, the ferroelectric element and control winding C2.

Assuming zero input at terminal 20, the ferroelectric crystal 10 will be cycled from its negative saturation region into its positive saturation region. The change in charge $\Delta Q$ across the ferroelectric element will be a maximum, and therefore, the current flow through control windings C1 and C2 will also be a maximum. The current flow through winding C1 will aid the power winding P1 to drive the core associated within these two windings into positive saturation. Since the power winding P2 is blocked at this time, control winding C2 alone will drive the core associated therewith from negative saturation to positive saturation.

During the next half cycle, when the upper end of the secondary of transformer 22 is negative with respect to the lower end thereof, diode 23 will block current flow through power winding P1, but diode 24 will allow current to flow through winding P2 and the load resistor $R_L$. Since the core associated with winding P2 was previously placed in a state of positive saturation by the current flow through winding C2, the winding P2 will offer high impedance to current flow so that a major portion of the A.C. voltage will be developed across winding P2 in driving the core associated therewith into negative saturation. This leaves only a negligible voltage drop across load resistor $R_L$. During this same time, current is flowing through the path in which the ferroelectric element is located to cycle the ferroelectric element from the negative saturation region into the positive saturation region. Here again, with zero D.C. control voltage applied to terminal 20, a maximum change in charge $\Delta Q$ will be produced across the ferroelectric element and result in a maximum current flow through the control windings C1 and C2. The current flow through control winding C2 will aid the current flow through winding P2 to drive the core associated with these two windings into negative saturation. However, the current flow through winding C1 at this time will serve alone to drive the core associated therewith into the negative saturation region. Thus, it will be seen that during one half cycle of the A.C. input voltage, one of the power windings for one core is operative to change the state of the core associated therewith, while the control winding of the other core is operative to change the state of said other core. During the next half cycle, the condition is reversed in that the other power winding is operative to change the state of the core associated therewith, while the other control winding is effective to change the state of said other core associated therewith. The action described will continue for additional cycles of the A.C. input source 19. As the D.C. control voltage rises above ground, the change in charge $\Delta Q$ across the ferroelectric element will vary accordingly. That is, as the D.C. conrtol voltage increases, $\Delta Q$ during each half cycle will decrease. As $\Delta Q$ decreases, the current flow through windings C1 and C2 also decreases so that the cores associated with these windings will be driven less and less into a particular saturation region.

From the arrangement of the dots on the drawings adjacent the windings in FIG. 2, the core associated with windings P1 and C1 will operate on its hysteresis loop shown in FIG. 4, according to the manner previously explained with respect to FIG. 1, with varying currents through the control winding C1. However, the core associated with windings P2 and C2 will always be driven into negative saturation and will work toward the positive saturation level to the extent it is caused to by the control current through control winding C2. In other words, for the second core, a change in flux $\Delta\phi 2$, as seen in FIG. 4, having a particular D.C. input voltage, would be measured from the point A as a reference rather than point B as a reference. In fact, all of the various changes in flux for the second core would be referenced in point A. If the dots were placed on the opposite ends of the windings P2 and C2, the core associated therewith would operate on its hysteresis loop in the same manner as that illustrated in FIG. 4; i.e., change in flux would be from point B as a reference. However, as shown in the drawings, the core associated with windings P1 and C1 will always go into its positive saturation region during the time current is allowed to flow through power winding P1, while the core associated with windings P2 and C2 will always go into its negative saturation region during the time current is allowed to flow through power winding P2. The core associated with windings P1 and C1 will go into negative saturation only when zero D.C. control voltage is applied and at other times will operate at different levels of changes in flux using point B as a reference. The core associated with windings P2 and C2 will go into positive saturation only when zero D.C. control voltage is applied, and at other times the changes in flux will vary from point A as a reference.

Assuming a condition where a D.C. control voltage of an amplitude such that the ferroelectric element is caused to cycle through the hysteresis loop shown in FIG. 5*c*, the current flow through power winding P1 will drive the core associated therewith into positive saturation. The current flow through control winding C2, now somewhat less than in the case where zero D.C. control voltage is applied, will return the core associated therewith toward the positive saturation region but not all the way into saturation. This is due to the fact that the current flowing through winding C2 is less than that required to return the core associated therewith to positive saturation. The lower current is due to the fact that $\Delta Q$ across the ferroelectric element is less with an applied D.C. voltage than where zero D.C. voltage is applied.

During the next half cycle, current will flow through power winding P2 and drive the core associated therewith all the way into negative saturation. This condition of the core occurs sooner during the half cycle than in the case where zero D.C. control voltage was applied, since the core was not all the way into positive saturation. The result is that a voltage is developed across the load resistor $R_L$. During the same half cycle, the ferroelectric element will be cycled to the lower portion of its hysteresis loop, such as that shown in FIG. 5*c*, and result in a current flow through winding C1 proportionate to the change in charge. This current flow through the control winding C1 will cause the core associated therewith to be driven toward, but not into, its negative saturation region. For example, the core would probably have a change in flux similar to $\Delta\phi 3$ in FIG. 4.

The above action, as described for one cycle, continues during additional cycles. It will be seen that the control windings C1 and C2 operate during alternate half cycles to condition their respective cores for the following half cycle. These windings are in circuit with a single ferroelectric element so that it affects each control winding and the core associated therewith equally during alternate half cycles. As the D.C. control voltage is varied from a minimum to a maximum, the change in charge $\Delta Q$ during succeeding half cycles will vary from a maximum to a minimum. Thus, current through windings C1 and C2, which are in circuit with the ferroelectric element, will vary proportionately with change in charge $\Delta Q$. As the control winding current decreases, the cores associated with windings C1 and C2 will become saturated increasingly sooner during the half cycle in which the power winding on a particular core is effective to produce saturation. This means that the output voltage will increase in amplitude as the control winding current decreases.

Figure 3:
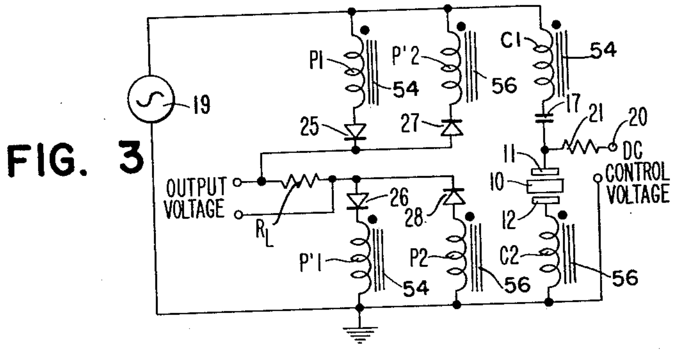
FIG. 3 shows a schematic diagram of a second form of a self-saturating magnetic amplifier of the full-wave type utilizing the control arrangement of the present invention.

Referring to FIG. 3, a second embodiment of a full-wave magnetic amplifier is shown to illustrate the applicability of the control arrangement of the present invention to different forms of magnetic amplifiers. This second embodiment eliminates the need for a center-tapped transformer. As shown in FIG. 3, one side of the A.C. source 19 is grounded, and the other side is applied to a first circuit path by a connection to one end of a winding P1, the other end of said winding being connected to the plate of a diode 25. The cathode of this diode is connected to one side of the load resistor $R_L$. The other side of resistor $R_L$ is connected to the plate of diode 26 which has its cathode connected to one end of a winding P'1. A ground connected is made to the other side of the last named winding. Windings P1 and P'1 are wound on the same saturable magnetic core 54. It will be seen that during the positive half cycle of the A.C. source 19, a current will flow through winding P1, diode 25, resistor $R_L$, and winding P'1, thus driving the core associated with these two windings into positive saturation.

The control arrangement previously described is also connected across A.C. source 19, and during the aforementioned half cycle of the A.C. source, assuming zero D.C. control voltage, a maximum current will flow through control windings C1 and C2 since the change in charge $\Delta Q$ across the ferroelectric crystal will be a maximum. The current through control winding C1, which is wound on the same core 54 with power windings P1 and P'1, will aid in driving the core into the positive saturation region. The current flow through control winding C2 during this time will serve to drive the core 56 associated therewith into the positive saturation region, it being understood that the core 56 associated with control winding C2 is different from the core 54 associated with the control winding C1. The ungrounded side of the A.C. source is also connected to one end of a power winding P'2 having its other end connected to the cathode of diode 27. The plate of the last mentioned diode is connected through the load resistor $R_L$ to the cathode of a diode 28, the plate of diode 28 being connected to one end of a power winding P2. The other end of the power winding P2 is connected to ground. Windings P2 and P'2 are wound on the same saturable magnetic core with the control winding C2. When the ungrounded side of A.C. source 19 becomes negative with respect to ground, i.e., during the negative half cycle, a current will flow through power winding P2, diode 28, resistor $R_L$, diode 27, and the power winding P'2, thus driving the core associated with these two windings into negative saturation. During this same negative half cycle, a maximum current will flow through control windings C1 and C2, since the change in charge $\Delta Q$ across the ferroelectric crystal is a maximum. The current through control winding C2 will aid in driving the core associated therewith into the negative saturation region, while the current flow through control winding C1 will serve to drive the core associated therewith into the negative saturation region.

From the above, it will be seen that with zero D.C. control voltage, the current flow through the power windings P1 and P'1 during the positive half cycle to place the core associated therewith in positive saturation leaves little opportunity to develop a voltage across the load resistor $R_L$. During this time, the control winding C2 is driving the core associated with power windings P2 and P'2 into the positive saturation region. This means that during the next half cycle, substantially all of the voltage will be developed across the power windings P2 and P'2, leaving only negligible voltage to be developed across the load resistor $R_L$. At the same time, the control winding C1 will condition the core associated with power windings P1 and P'1 back into the negative saturation region so that during the next positive half cycle, substantially all of the voltage will be developed across the power windings, leaving only negligible voltage to be developed across the load resistor $R_L$. Thus, with zero D.C. control voltage applied, a very negligible output voltage is developed.

From the explanation of the operation of the previous circuits, it should be apparent that as the D.C. control voltage increases, the current through the control windings C1 and C2 will decrease and, therefore, have less and less effect on the cores associated therewith during the half cycles in which the power windings on the cores are ineffective. This allows the power windings to reach their particular saturation level at an earlier time during their particular effective half cycle so that a larger output voltage is developed.

It should be understood with respect to FIGS. 2 and 3 that the output voltage is full-wave in nature rather than the half-wave voltages shown in FIG. 7.

Referring now to FIG. 6, there is illustrated a magnetic amplifier of the saturable reactor type which is capable of utilizing the control arrangement of the present invention. There is provided a single saturable magnetic core 30 having a power winding P, a control winding C and a load winding L wound thereon. An A.C. source 19 is connected across the power winding P, one side of said winding being grounded. The ungrounded side of the A.C. source is connected to one side of the control winding C, the other side of said control winding being coupled by capacitor 17 to plate 11 of ferroelectric crystal 10. Plate 12 of the ferroelectric crystal is connected to ground. A D.C. control voltage is adapted to be applied through resistor 21 to a point intermediate capacitor 17 and the ferroelectric element. The output voltage is adapted to be taken from across the load winding L.

The operation of this embodiment of the invention, assuming a zero D.C. control voltage, is such that during the positive half cycle of A.C. source 19, a current flows through the power winding P to drive the core 30 toward positive saturation. During the same half cycle, the voltage applied to control winding C, capacitor 17 and the ferroelectric element causes the ferroelectric element to be cycled from its negative saturation level into its positive saturation level, the current flow through winding C opposing the mmf. of the power winding. During the negative half cycle, the power winding is driven toward negative saturation, opposed again by the current flow through control winding C. That is, the current associated with the change in charge $\Delta Q$ in cycling the ferroelectric crystal 10 from its positive saturation level into its negative saturation level will oppose the current in the power winding in driving the core 30 into negative saturation. When the D.C. control voltage is increased from the assumed zero input level, the ferroelectric crystal will be cycled through a smaller portion of its hysteresis loop and result in a smaller current flow through control winding C. This means that this winding will have less and less effect in opposing the mmf. of the power winding. The result is an increase in output voltage across the output winding L.

From the above detailed description, it will be seen that I have provided a new and improved control arrangement for magnetic amplifiers which offers a high impedance to the control source. This means that the control arrangement has a very small power requirement from the control source and permits small signal control. It has been illustrated that a single control device in the form of a ferroelectric element can control either a half-wave or full-wave self-saturating type magnetic amplifier. The control arrangement also permits operation with a saturable reactor type magnetic amplifier.

The normal bias windings and additional bias controls used in magnetic amplifiers to assure minimum output voltage with minimum control voltage are not used in the present invention. This capability is inherently possessed by the invention. Other advantages of utilizing a ferroelectric element as a control means for a magnetic amplifier are high reliability and long life.

In all of the embodiments, the same A.C. source has been used for the control winding path as that used in the power winding path. There will be instances where it will be desirable to use a lesser A.C. voltage in the control path than in the power winding path. It will be understood that the use of separate A.C. sources does not change the operation of the present invention as described when the two sources are in phase with each other. Alternatively, current limiting devices may be used in the control winding path to decrease the A.C. voltage applied across the ferroelectric element.

While capacitor 17 has been illustrated as being connected in a particular relation to the other elements in the control winding path, it will be apparent that its function of isolating the D.C. control voltage from the A.C. source connected across the control winding path can be achieved with the capacitor in other locations in the control winding path. Since the embodiments illustrated show the same A.C. source for the control winding path as for the power winding path, the capacitor also serves to isolate the D.C. control voltage from the power winding path. It will also be apparent that in the embodiments using two control windings, it is unnecessary that one winding be on one side of the ferroelectric element and the other winding on the other side of the said element. Their series connection with the ferroelectric element and the connection of an A.C. source across the complete control winding path is sufficient.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A magnetic amplifier including a control winding path and a power winding path having an alternating current voltage source applied thereacross, said control winding path comprising the series connection of a control winding on a saturable magnetic core, a ferroelectric element, means for applying a direct current control voltage across said ferroelectric element, and a capacitor in said control winding path for blocking said direct current control voltage from said alternating current source, said direct current control voltage determining the change in charge across said ferroelectric element during each half cycle of said alternating current voltage and thereby the current flow through said control winding path, said power winding path comprising the series connection of a power winding on said saturable magnetic core, a rectifier device and a load device.

2. A magnetic amplifier including a control winding path, first and second power winding paths, an alternating current voltage source for said paths, said alternating current voltage source including a transformer output winding with a grounded center tap, said transformer output winding being connected across said control winding path, said control winding path comprising first and second control windings on first and second saturable magnetic cores, respectively, a ferroelectric element, said first and second control windings and said ferroelectric element being serially connected, means for applying a direct current control voltage across said ferroelectric element, and a capacitor in said control winding path for blocking said direct current control voltage from said alternating current source, said direct current control voltage determining the change in charge across said ferroelectric element during each half cycle of said alternating current voltage and thereby the current flow through said control winding path, said first power winding path comprising the series connection of a first power winding on said first saturable magnetic core, a first rectifier device and a load device, said first power winding path being connected between said center tap on said output transformer winding and one end thereof, said second power winding path comprising the series connection of a second power winding on said second saturable magnetic core, a second rectifier device and said load device, said first and second rectifier devices being oppositely poled at their connection to said load device, said second power winding path being connected between said center tap on said output transformer winding and the other end thereof.

3. A magnetic amplifier including a control winding path, a first power winding path and a second power winding path, an alternating current voltage source connected across said paths, said control winding path comprising first and second control windings on first and second saturable magnetic cores, respectively, a ferroelectric element, said first and second control windings and said ferroelectric element being serially connected, means for applying a direct current control voltage across said ferroelectric element, and a capacitor in said control winding path for blocking said direct current control voltage from said alternating current voltage source, said direct current control voltage determining the change in charge across said ferroelectric element during each half cycle of said alternating current voltage and thereby the current flow through said control winding path, said first power winding path comprising the series connection of first and second power windings on said first saturable magnetic core, a load device and commonly poled first and second rectifier devices interconnecting said first and second power windings via said load device, said second power winding path comprising the series connection of third and fourth power windings on said second saturable magnetic core and third and fourth commonly poled rectifier devices interconnecting said third and fourth power windings via said load device, said first and second power winding paths being connected to said alternating current voltage source so that said first and fourth rectifier devices are oppositely poled relative thereto.

References Cited in the file of this patent

UNITED STATES PATENTS

| | | |
|---|---|---|
| 2,182,377 | Guanella | Dec. 5, 1939 |
| 2,653,254 | Spitzer et al. | Sept. 22, 1953 |
| 2,770,737 | Ramey | Nov. 13, 1956 |
| 2,798,904 | Alexanderson | July 9, 1957 |
| 2,873,380 | Kazan | Feb. 10, 1959 |